(12) United States Patent
Jia et al.

(10) Patent No.: US 8,968,534 B2
(45) Date of Patent: Mar. 3, 2015

(54) WATER OXIDATION CATALYST

(75) Inventors: Hongfei Jia, Ann Arbor, MI (US); Takeshi Sekito, Kariya-Aichi (JP)

(73) Assignees: Toyota Motor Egineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 395 days.

(21) Appl. No.: 13/362,041

(22) Filed: Jan. 31, 2012

(65) Prior Publication Data

US 2013/0192999 A1 Aug. 1, 2013

(51) Int. Cl.
*C25B 9/16* (2006.01)
*C25B 1/04* (2006.01)

(52) U.S. Cl.
USPC ............ 204/290.13; 205/628; 205/340

(58) Field of Classification Search
CPC ............. C25B 1/003; C25B 1/04; C25B 9/16
USPC ............ 205/628–637, 340; 204/290.13
See application file for complete search history.

(56) References Cited

U.S. PATENT DOCUMENTS

| | | | |
|---|---|---|---|
| 4,107,025 A * | 8/1978 | Loutfy et al. | 204/290.09 |
| 5,306,579 A | 4/1994 | Shepard, Jr. et al. | |
| 6,127,060 A | 10/2000 | Read | |
| 1,019,905 A1 | 8/2011 | Burchardt at al. | |
| 2009/0127165 A1* | 5/2009 | Eijsbouts-Spickova et al. | 208/216 R |
| 2010/0133111 A1* | 6/2010 | Nocera et al. | 205/633 |
| 2011/0114496 A1 | 5/2011 | Dopp et al. | |

* cited by examiner

*Primary Examiner* — Nicholas A Smith
(74) *Attorney, Agent, or Firm* — Gifford, Krass, Sprinkle, Anderson & Citkowski, P.C.

(57) ABSTRACT

A process for oxidizing water using amorphous cobalt tungstate is disclosed. A plurality of amorphous cobalt tungstate nanoparticles are supported on an electrode and are able to catalytically interact with water molecules generating oxygen. The catalyst can be used as part of a electrochemical or photo-electrochemical cell for the generation of electrical energy.

14 Claims, 6 Drawing Sheets

WATER OXIDATION CATALYST

FIELD OF THE INVENTION

The invention relates to a process and apparatus using cobalt tungstate as a catalyst for the electrochemical and photochemical-electrolysis of water, and in particular to a process and apparatus using amorphous cobalt tungstate as a catalyst for the photochemical-oxidation of water.

BACKGROUND OF THE INVENTION

Hydrogen has long been considered an ideal fuel source, as it offers a clean, non-polluting alternative to fossil fuels. One source of hydrogen is the splitting of water into hydrogen ($H_2$) and oxygen ($O_2$), as depicted in equation (1).

$$2H_2O \rightarrow O_2 + 2H_2 \quad (1)$$

In an electrochemical half-cell, the water-splitting reaction comprises two half-reactions:

$$2H_2O \rightarrow O_2 + 4H^+ + 4e^- \quad (2)$$

$$2H^+ + 2e^- \rightarrow H_2 \quad (3)$$

and hydrogen made from water using sunlight prospectively offers an abundant, renewable, clean energy source. As such, efforts have been made to search for efficient oxygen evolution reaction (OER) catalysts that can produce hydrogen from water. In particular, oxides of ruthenium and iridium have previously been identified. However, as they are among the rarest elements on earth, it is not practical to use these catalysts on a large scale. Therefore, an improved OER catalysts would be very useful in the development of hydrogen as an alternative fuel source.

SUMMARY OF THE INVENTION

In one aspect there is disclosed a process for oxidizing water to produce hydrogen. The process includes placing water in contact with amorphous cobalt tungstate, the amorphous cobalt tungstate catalyzing the oxidation of water and producing hydrogen and oxygen. The amorphous cobalt tungstate can be a plurality of amorphous cobalt tungstate nanoparticles which may or may not be attached to an electrode with an electrical potential applied between the electrode and the water to generate hydrogen and/or oxygen.

In a further aspect of the invention, a cell for oxidizing water to produce hydrogen is disclosed. The cell comprises water and amorphous cobalt tungstate, where the amorphous cobalt tungstate catalyzes the oxidation of water and produces hydrogen. The cell may further comprise a container to hold the water.

In yet a further aspect, a photo-sensitizer may be added to the water in contact with amorphous cobalt tungstate, and the water plus amorphous cobalt tungstate plus photo-sensitizer mixture exposed to electromagnetic radiation. In this aspect, the photo-sensitizer provides an electrical potential between the amorphous cobalt tungstate and the water. In some instances, the photo-sensitizer may be a ruthenium-tris(2,2'-bipyridal) compound, such as ruthenium-tris(2,2'-bipyridal) chloride.

DETAILED DESCRIPTION OF THE INVENTION

The present disclosure provides a method, apparatus and/or composition for the oxidation of water to generate hydrogen and/or oxygen gases. The method includes providing an amorphous cobalt tungstate ($CoWO_4$) catalyst material and adding the catalyst to water under a condition effective to generate hydrogen and/or oxygen. In one embodiment, the method further includes exposing the water, which contains the catalyst, to light radiation to generate hydrogen and/or oxygen gases.

A "catalyst" as used herein, means a material that is involved in and increases the rate of a chemical electrolysis reaction (or other electrochemical reaction) and which itself, undergoes reaction as part of the electrolysis, but is largely unconsumed by the reaction itself, and may participate in multiple chemical transformations. A catalytic material of the invention may be consumed in slight quantities during some uses and may be, in many embodiments, regenerated to its original chemical state.

The catalyst can include a plurality of amorphous cobalt tungstate nanoparticles. In some instances, the nanoparticles are uniform in size and can have an average particle size of less than 100 nm. In one embodiment, the amorphous cobalt tungstate is attached to an electrode using any method known to those in the art. For example and illustrative purposes only, absorption techniques, adhesives, deposition techniques and the like can be used to attach the amorphous cobalt tungstate to the electrode.

In some instances, the electrode can have channels and water can be brought into contact with the catalyst at a rate that allows the water to be incorporated into the electrode channels. In addition, the electrode can be in an aqueous solution and/or be part of an electrochemical cell and/or part of a photo-electrochemical cell, which may or may not include a container.

The container may be any receptacle, such as a carton, can or jar, in which components of an electrochemical device may be held or carried. A container may be fabricated using any known techniques or materials, as will be known to those of ordinary skill in the art. The container may have any shape or size, providing it can contain the components of the electrochemical device. Components of the electrochemical device may be mounted in the container. That is, a component, for example, an electrode, may be associated with the container such that it is immobilized with respect to the container, and in some cases, supported by the container.

In some instances, an electrochemical cell containing an embodiment of the present invention offers a highly efficient method of splitting water using solar illumination, without the need for an applied potential. Upon oxidation of water at a photo-anode, hydrogen protons are generated which are then reduced to form hydrogen gas at a counter electrode. In addition, the oxygen and hydrogen generated from the cell can be passed directly to a fuel cell to generate further power.

Figure 1:
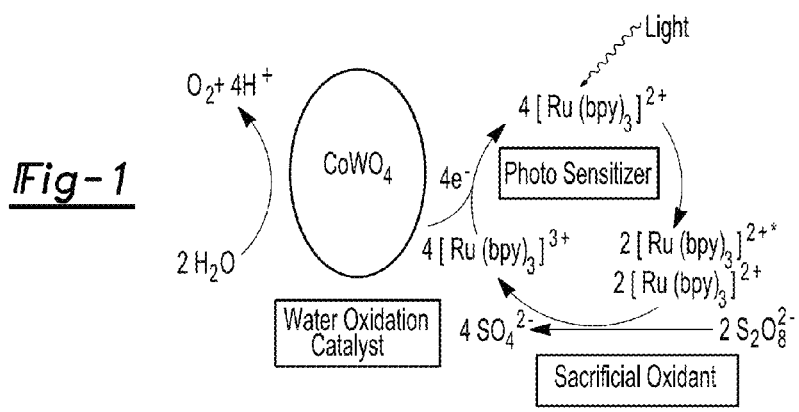
FIG. 1 is a schematic representation of the proposed mechanism by which cobalt tungstate ($CoWO_4$) serves as a water oxidation catalyst for converting water to its elemental components with electrons transferred to a sacrificial electron acceptor such as $[Ru(bpy)_3]^{3+}$ and $S_2O_8^{2-}$.

In a further embodiment, the electrochemical cell can be driven either by a photo-anode such as a dye sensitized semiconductor or an external potential. The dye sensitized semiconductor acts as a chemical/photo-electrical relay system. For example and for illustrative purposes only, FIG. 1 illustrates a sequence of electron transfer that can occur in a photo-electrical relay system. Examples of such relay systems include ruthenium N-donor dyes such as ruthenium polypyridal dyes that can absorb visible light and accept electrons from an amorphous cobalt tungstate catalyst material and thereby assist in the oxidation of water that is in contact with the catalyst. In some instances, the photo-sensitizer can be a ruthenium-tris(2,2'-bipyridyl) compound such as ruthenium-tris(2,2'-bipyridyl) chloride.

The invention is further described by the following examples, which are illustrative of specific modes of practicing the invention and are not intended as limiting the scope of the invention defined in the claims.

EXAMPLES

Example I

Preparation of Amorphous $CoWO_4$

Figure 2:
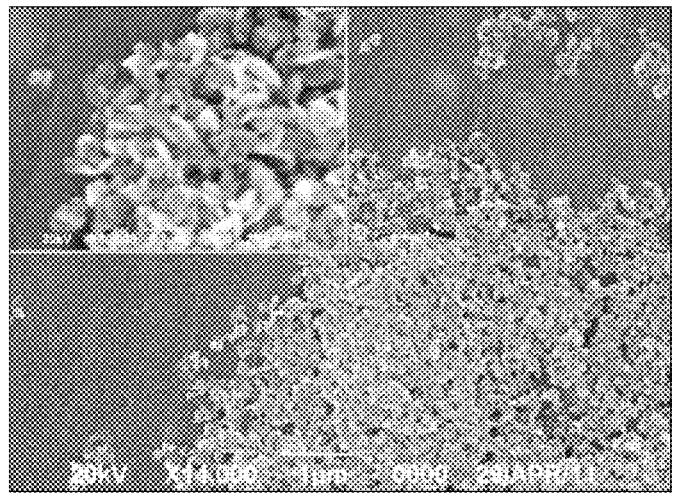
FIG. 2 is a pair of scanning electron microscopy (SEM) images of amorphous $CoWO_4$ nanoparticles.

Starting materials of $Co(NO_3)_2 \cdot 6H_2O$ (Mw=291.03 g/mol) and $Na_2WO_4 \cdot 2H_2O$ (Mw=329.85 g/mol) were purchased from Sigma-Aldrich and used directly without further purification. In a typical synthesis a $Co(NO_3)_2$ solution (7.85 g in 10 ml of water) was added drop-wise into a $NaWO_4$ solution (8.91 g in 15 ml of water) with strong agitation. A purple suspension indicative of $CoWO_4$ precipitation formed immediately. The solution mixture was rinsed with water on a centrifuge and the particles were then washed with ethanol prior to drying overnight in an oven at 45° C. A final powder product was examined by SEM (FIG. 2) and energy dispersive x-ray (EDX) analysis with an average particle size of less than 100 nm confirmed along with the presence of cobalt, tungsten, and oxygen. The particles were also examined using transmission electron microscopy (TEM) and powder x-ray diffraction and determined to be amorphous.

Example II

Cyclic Voltammetry (CV) of $CoWO_4$

Carbon paste electrodes were prepared by grinding $CoWO_4$ nanoparticles produced according to Example I above with carbon paste (BASI, CF-1010) at weight loadings for the $CoWO_4$ material ranging from 0 to 10 wt %. The $CoWO_4$-loaded carbon paste was then loaded onto an electrode body (BASI, MF-2010) and sanded to produce a working electrode. The electrode had a diameter of 3 mm and a surface area estimated to be 0.071 $cm^2$. The CV studies were performed in a simple 3-electrode cell with Ag/AgCl and Pt wire as reference and counter electrodes, respectively. The electrolyte had a pH of 7 and was obtained with a phosphate buffer at concentrations of 50 and 200 mM. Typical scan rates were 5 and 25 mV/s with higher scanning rates (>100 mV/s) avoided due to interface capacitance causing a significant increase in non catalytic current.

Figure 3:
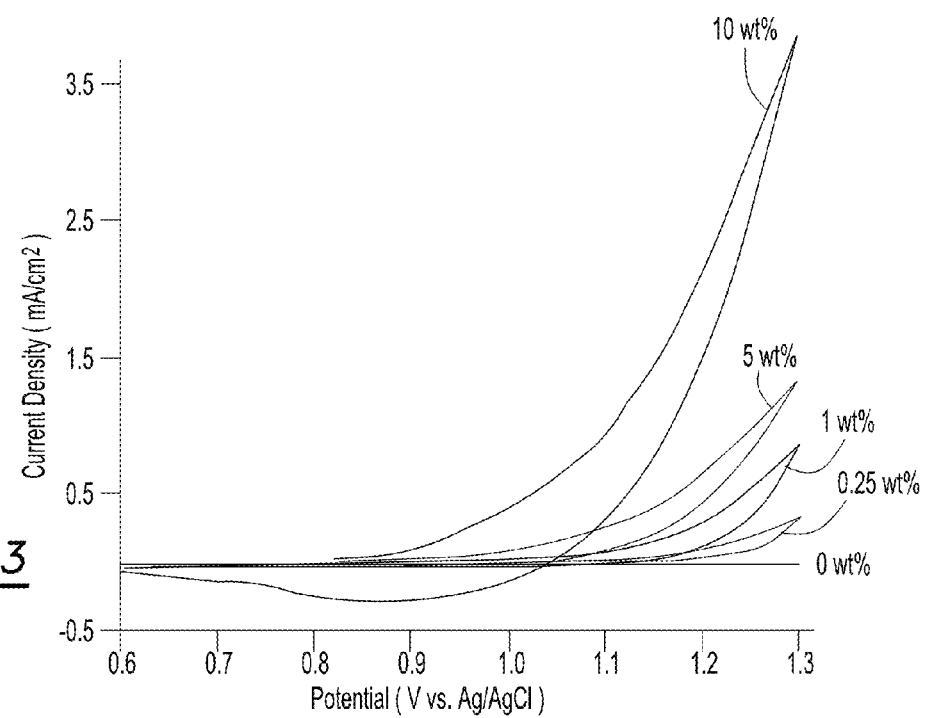
FIG. 3 is a graphical representation of cyclic voltammetry traces using a scan rate of 25 mV/s for carbon paste electrodes loaded with 0 to 10 wt % of amorphous $CoWO_4$ catalyst material.
Figure 4:
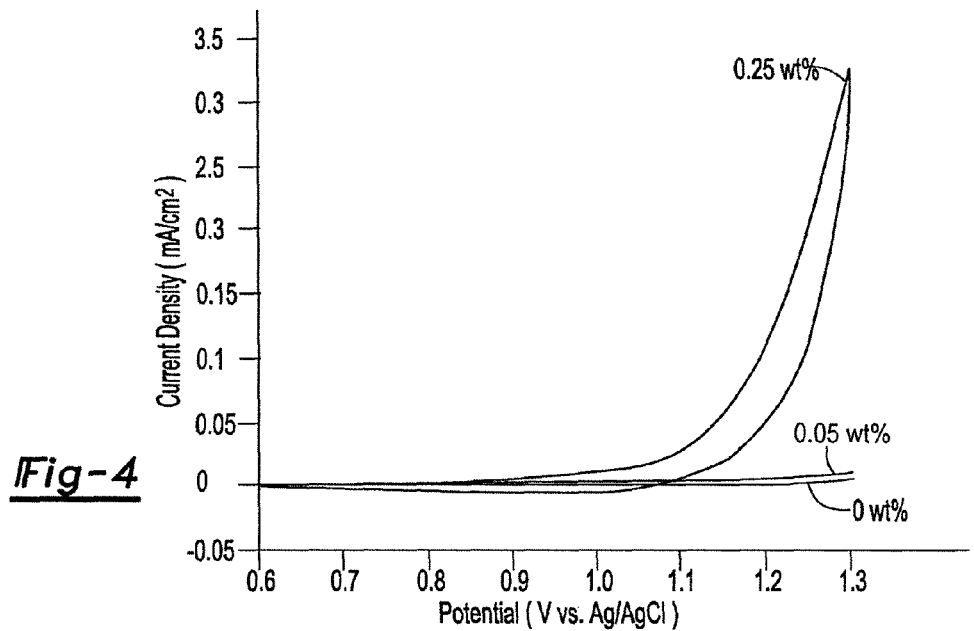
FIG. 4 is an isolated view of FIG. 3 highlighting the current density for carbon paste electrodes loaded with 0 wt. %, 0.05 wt % and 0.25 wt. % amorphous $CoWO_4$ catalyst material.

Cyclic voltammogram traces for the $CoWO_4$-loaded carbon paste electrodes are shown in FIG. 3. As shown in the figure, no catalytic current was observed for the carbon paste electrode without $CoWO_4$, even at high potentials (1.2 V~1.3 V). In contrast, with a $CoWO_4$ loading of just 0.25 wt %, appreciable catalytic current was detected as shown in FIGS. 3 and 4.

Given that water oxidation involves the formation of protons, an anode potential for an electrochemical cell with water oxidation can be correlated to solution pH (proton concentration) based on the Nernst equation:

$$E_{anode} = 1.23 \text{ V} - 0.059(\text{pH})\text{V vs. normal hydrogen electrode (NHE)}.$$

Figure 5:
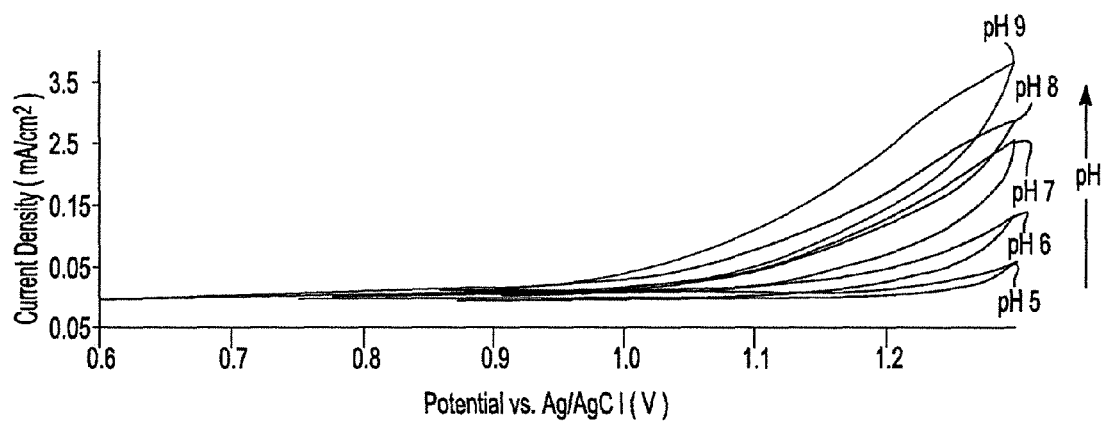
FIG. 5 is a graphical representation of cyclic voltammetry traces using a scan rate of 5 mV/s for an amorphous 1 wt % $CoWO_4$-carbon paste electrode in buffer solutions of varying pH.

Stated differently, if a half reaction of the water oxidation process is thermodynamically controlled, significant change for the measured overpotential should occur as the pH of the electrolyte changes. Confirmation of this principle was observed as shown in FIG. 5 which illustrates current density as a function of potential for electrolyte solutions having a pH of 5, 6, 7, 8 and 9, and in which an oxidation current was observed at lower potentials as the pH increased. As such, it is appreciated that FIG. 5 provides secondary evidence that the amorphous $CoWO_4$ nanoparticles (1 wt %) had catalyzed a proton forming reaction.

Example III

Impact of Sintering on $CoWO_4$ Activity

Figure 6:
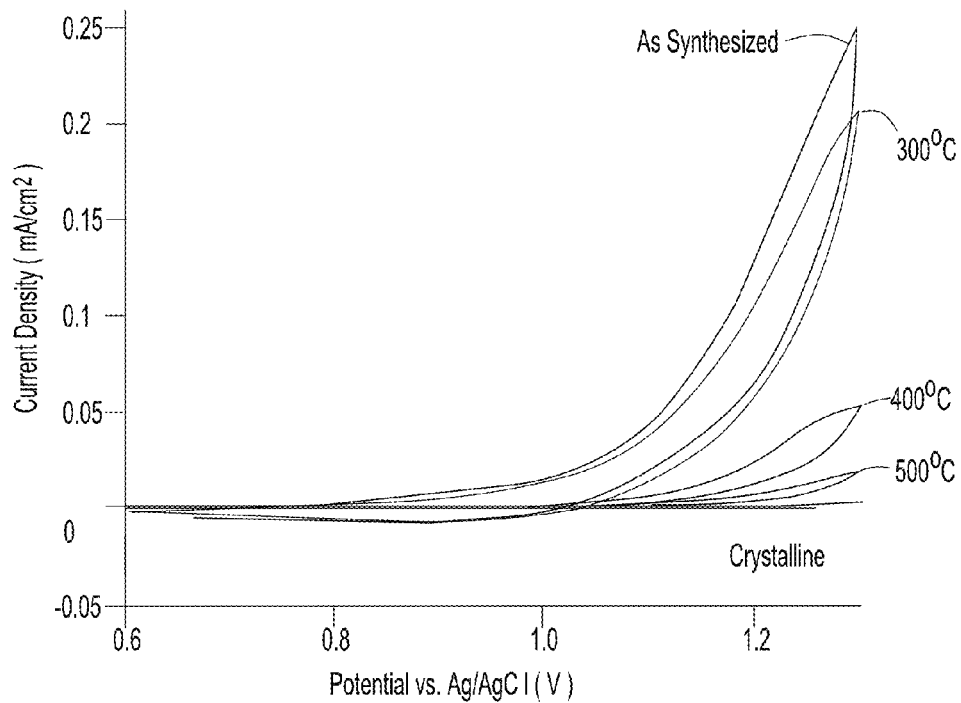
FIG. 6 is a graphical representation comparing catalytic activity of amorphous $CoWO_4$ (as synthesized); crystalline $CoWO_4$; amorphous $CoWO_4$ annealed at 300° C.; amorphous $CoWO_4$ annealed at 400° C.; and amorphous $CoWO_4$ annealed at 500° C.

In order to determine the activity of amorphous $CoWO_4$ nanoparticles with non-amorphous $CoWO_4$ nanoparticles, amorphous $CoWO_4$ powders produced according to Example I above were subjected to annealing treatments at 300, 400 and 500° C. for 1 hour. After an annealing treatment, a given annealed powder was combined with carbon paste to produce an electrode as described above, and the electrode was then subjected to CV testing. FIG. 6 illustrates a plot of the CV testing results with the crystalline material results being produced with commercially available crystalline $CoWO_4$ powder. As shown in the figure, sintering of the amorphous $CoWO_4$ nanoparticles resulted in a decrease in catalytic activity and could be due to crystal structure changes, agglomeration of the nanoparticles, changes in surface properties and the like.

Example IV

Deposition of $CoWO_4$ on Indium Tin Oxide Electrode

Indium tin oxide (ITO) electrodes were selected for additional water oxidation testing with ITO glass slides measuring 25×75 mm purchased from SPI Supplies (#6415-CF). ITO electrodes were produced by cutting an ITO glass slide into four equal pieces using a diamond blade, each ITO glass slide producing four ITO electrodes.

To immobilize or attach amorphous $CoWO_4$ nanoparticles on an ITO electrode, cobalt tungstate nanoparticles produced according to Example I were first dispersed in ethanol. A typical dispersion solution contained 10 mg of $CoWO_4$ nanoparticles in 1 ml of ethanol. The dispersion solution was sonicated for approximately 20 minutes and the $CoWO_4$ nanoparticles remained well-dispersed for up to several days in the ethanol.

Deposition of $CoWO_4$ nanoparticles onto ITO glass slides was performed using a dipping technique and a Nima Dip Coater in order to achieve uniform coating. The $CoWO_4$-ITO electrodes were then baked in an oven at 150° C. for one hour.

Example V

Verification of Catalytic Activity of $CoWO_4$ on ITO Electrodes

Figure 7:
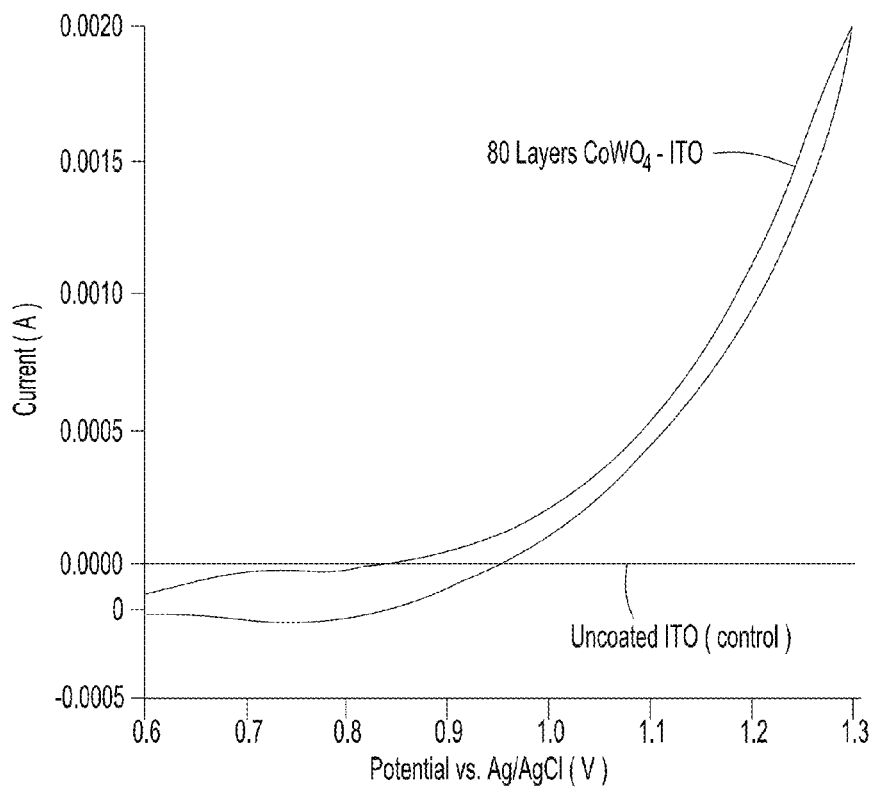
FIG. 7 is a graphical representation of a cyclic voltammogram comparing anodic current for indium tin oxide (ITO) electrodes with and without amorphous $CoWO_4$ catalyst material.
Figure 8:
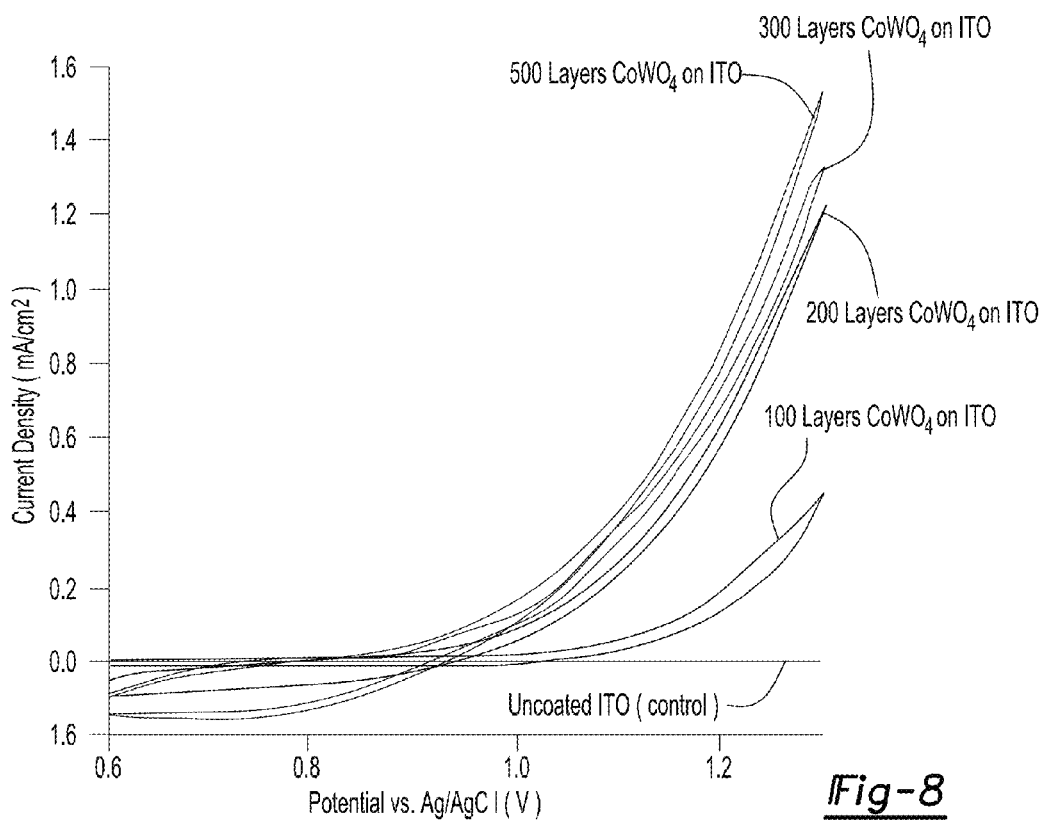
FIG. 8 is a graphical representation of cyclic voltammetry traces comparing electrode activity of amorphous $CoWO_4$-ITO electrodes having 0, 100, 200, 300, and 500 layers of amorphous $CoWO_4$ catalyst material.

As a control experiment, ITO electrodes with and without $CoWO_4$ were subjected to cyclic voltammogram testing with results of such testing shown in FIG. 7. As shown in the figure, no catalytic current was observed for the ITO electrodes that did not have $CoWO_4$ attached thereto, whereas an ITO electrode with 80 layers of $CoWO_4$ nanoparticles applied using the Nima Dip Coater mentioned above exhibited a significant increase in anodic current. In addition, FIG. 8 illustrates current density as a function of potential for ITO electrodes having 0, 100, 200, 300 and 500 layers of $CoWO_4$ nanoparticles applied thereto. It is appreciated from FIG. 8 that the increase in current density between 0 and 100 layers, and between 100 and 200 layers is significant, however additional increases between 200, 300 and 500 are minimal. Not being bound by theory, it is postulated that for 200 layers and more of the amorphous $CoWO_4$ nanoparticles, mass transfer is the rate limiting step in the water oxidation reaction.

Example VI

Verification of Oxygen Production

Figure 9:
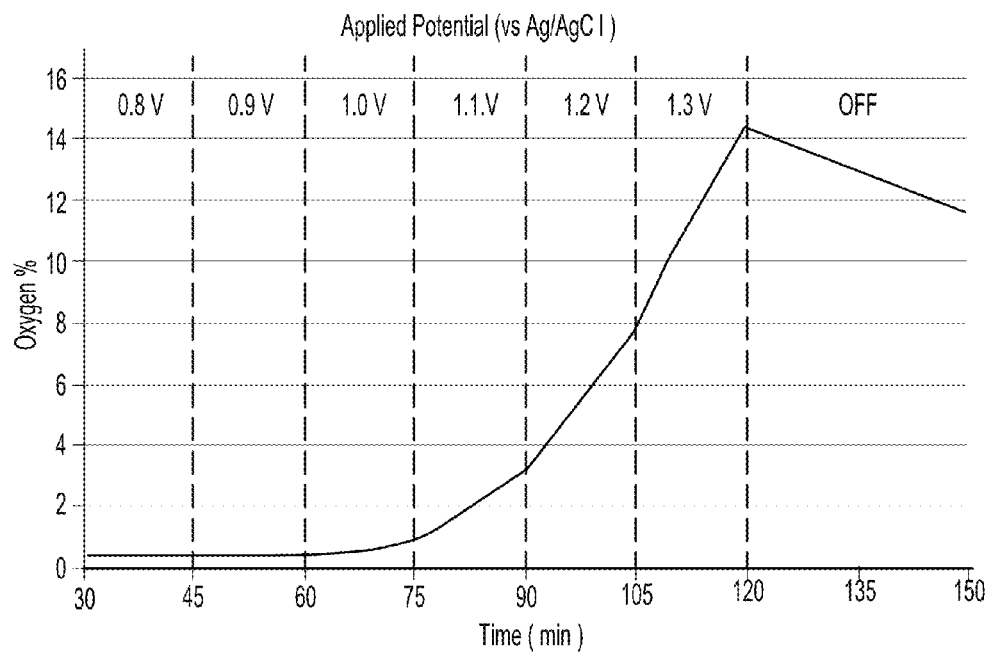
FIG. 9 is a graphical representation of percent oxygen produced as a function of time for a working potential applied to an ITO electrode coated with 80 layers of amorphous $CoWO_4$ catalyst material.

An air-tight H-cell was designed to quantify oxygen production in the cell. A copper rod with an alligator clip was attached at one end to hold the $CoWO_4$-ITO electrode, while Ag/AgCl and platinum coils were used as reference and counter electrodes, respectively. The two chambers in this H-cell were typically filled with 35 ml of pH 7 phosphate buffer (200 mM). The electrode area was controlled by covering the undesired area with Teflon tape. The typical electrode area used in these studies was 1 $cm^2$ and scan rates of 5 and 25 mV/s were used for a potentiostatic study in which real-time monitoring of the concentration of dissolved oxygen in the electrolyte was performed. The study included a $CoWO_4$-ITO working electrode being set at voltages between 0.8-1.3 V versus the Ag/AgCl reference electrode for 15 minutes under each applied potential, and the concentration of oxygen near the electrode was recorded continuously throughout the study. As shown in FIG. 9, an increase in oxygen concentration was observed at voltages as low as 1.0 V (~200 mV overpotential). A drop in oxygen concentration was also observed when there was no potential applied. Without being bound by theory, this result suggests that $Co^{2+}$ ions might have been "activated" to $Co^{3+}$ or $Co^{4+}$ for catalytic oxidation of water.

Example VII

Photo-Catalytic Activity of $CoWO_4$

Use of a photo-sensitizer was investigated in order to determine if electromagnetic radiation, e.g. visible light, could be used as an energy source for water oxidation using the amorphous $CoWO_4$ disclosed above. Ruthenium-tris(2,2'-bipyridyl) $(Ru(bpy)_3)$ chloride, which served as a photo-sensitizer, and sodium peroxodisulfate, which served as a sacrificial oxidant, (FIG. 1) were added to an electrolyte of a cell having an Ag/AgCl electrode and a Pt electrode that provided a closed circuit. In addition, a 100 watt xenon lamp having a light intensity of 550 watts per square meter was used as an electromagnetic radiation source.

Figure 10:
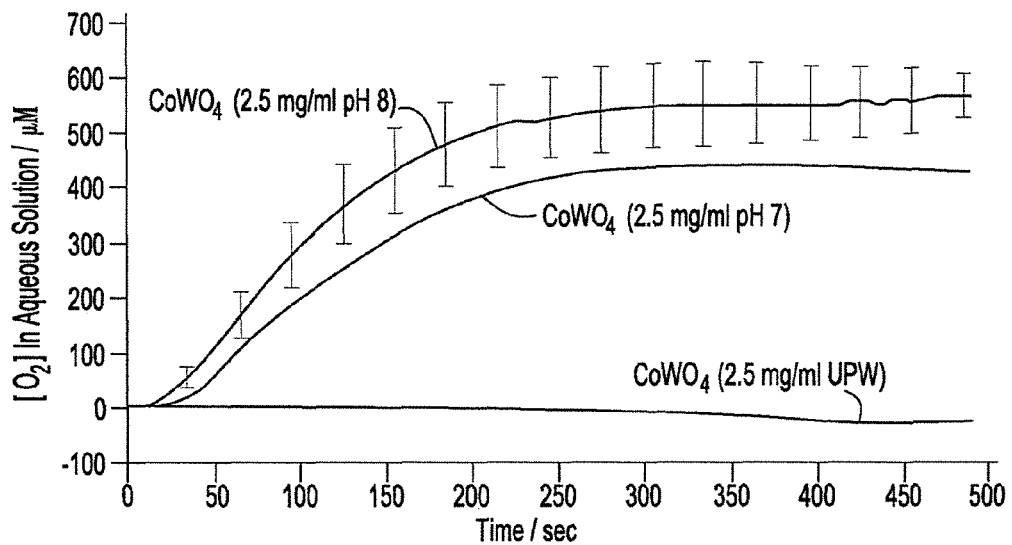
FIG. 10 is a graphical representation comparing photocatalytic activity of amorphous $CoWO_4$ catalyst material in an electrolyte of ultra pure water (UPW), a buffered aqueous electrolyte having a pH of 7, and a buffered aqueous electrolyte having a pH of 8.

Referring now to FIG. 10, oxygen concentration as a function of time for 2.5 mg/ml of amorphous $CoWO_4$ nanoparticles in an electrolyte of pH 7, pH 8 and ultra pure water (UPW) is shown. As shown in the figure, the amorphous $CoWO_4$ nanoparticles clearly exhibited photo-catalytic activity with a dependence on solution pH.

Figure 11:
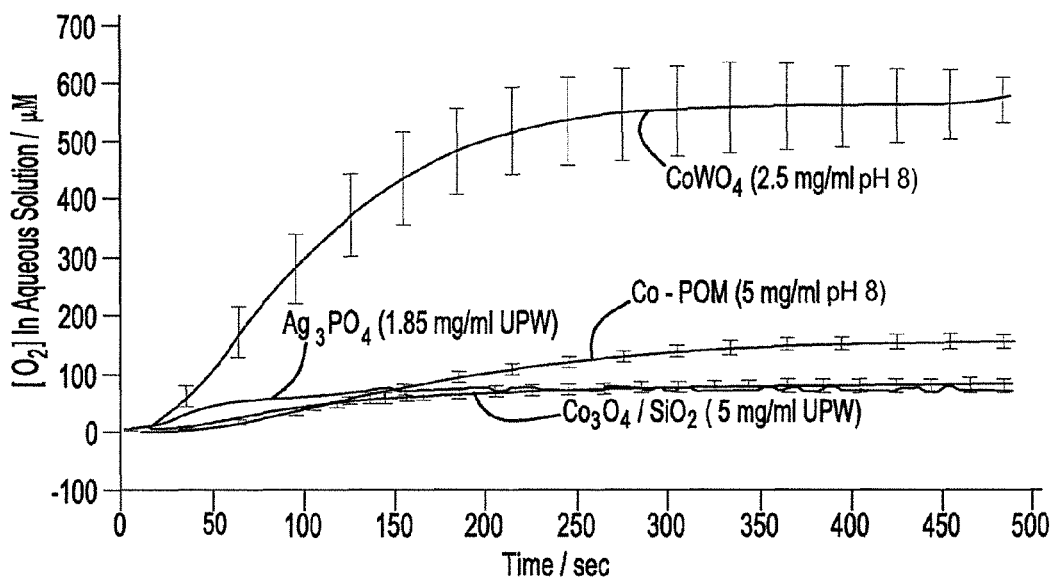
FIG. 11 is a graphical representation comparing photocatalytic activity of amorphous $CoWO_4$ in a buffered aqueous electrolyte having a pH of 8, $Co_3O_4/SiO_2$ in UPW, $Ag_3PO_4$ in UPW and Co-polyoxometalate (Co-POM) in a buffered aqueous electrolyte having a pH of 8.
Figure 12:
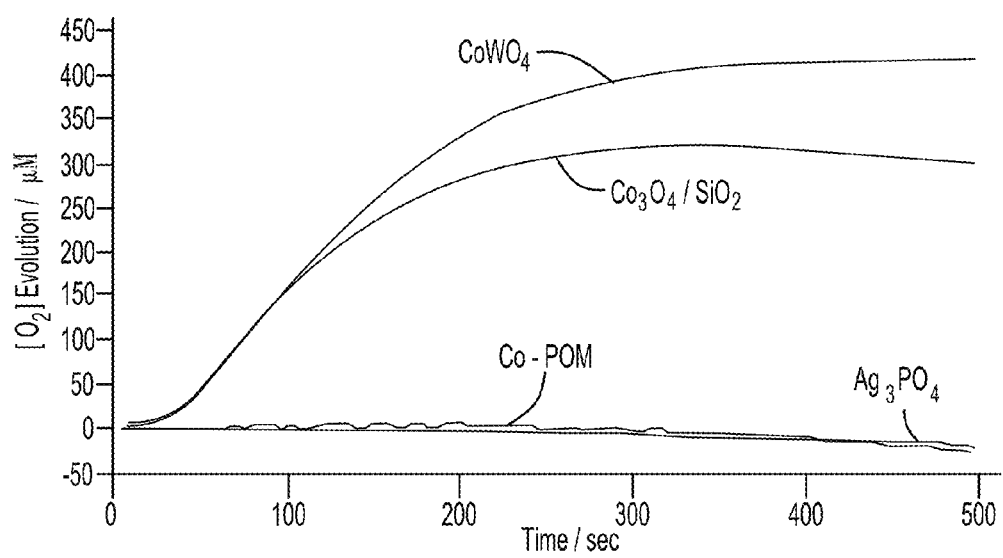
FIG. 12 is a graphical representation comparing photocatalytic activity for amorphous $CoWO_4$, $Co_3O_4/SiO_2$, $Ag_3PO_4$ and Co-POM in a buffered aqueous electrolyte having a pH of 7.

In addition to the above, FIG. 11 is a graph of oxygen concentration as a function of time illustrating the photo-catalytic activity of the inventive material disclosed herein compared to published data for the heretofore known catalyst materials $Co_3O_4/SiO_2$, $Ag_3PO_4$ and Co-POM. The data for the $Co_3O_4/SiO_2$ and $Ag_3PO_4$ materials was obtained using an electrolyte of UPW whereas the data for the Co-POM and the amorphous $CoWO_4$ nanoparticles was obtained using an electrolyte having a pH of 8. As such, experiments were performed using a single electrolyte having a pH of 7 obtained with a 0.1M phosphate buffer and a catalyst material concentration of 2.5 mg/ml. The results of the experiments are shown in FIG. 12 with the amorphous $CoWO_4$ nanoparticles outperforming the remaining materials by at least 1.4 times.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:
1. A process for oxidizing water, the process comprising:
providing an electrode with a coating, the coating consisting essentially of amorphous cobalt tungstate;
providing water; and
placing the water into contact with the electrode, the amorphous cobalt tungstate catalyzing the oxidation of water with a catalytic activity as measured by current density at least 200% greater than a catalytic activity of crystalline cobalt tungstate.

2. The process of claim 1, wherein the amorphous cobalt tungstate is a plurality of amorphous cobalt tungstate nanoparticles.

3. The process of claim 2, further including applying an electrical potential between the amorphous cobalt tungstate and the water.

4. The process of claim 3, wherein the amorphous cobalt tungstate is attached to an electrode.

5. The process of claim 4, wherein the electrode is part of an electrochemical cell containing the water.

6. The process of claim 2, further including adding a photo-sensitizer to the water and exposing the water with photo-sensitizer to electromagnetic radiation, the photo-sensitizer providing an electrical potential between the amorphous cobalt tungstate and the water.

7. The process of claim 6, wherein the photo-sensitizer is a ruthenium-tris(2,2'-bipyridyl) compound.

8. The process of claim 7, wherein the ruthenium-tris(2,2'-bipyridyl) compound is ruthenium-tris(2,2'-bipyridyl) chloride.

9. A cell for oxidizing water, said cell comprising:
an electrode with a coating, said coating consisting essentially of amorphous cobalt tungstate;
a container with water, said amorphous cobalt tungstate in contact with said water;
said electrode with said amorphous cobalt tungstate catalyzing oxidation of said water with a catalytic activity as measured by current density at least 200% greater than a catalytic activity of crystalline cobalt tungstate.

10. The cell of claim 9, wherein said amorphous cobalt tungstate is a plurality of amorphous cobalt tungstate nanoparticles.

11. The cell of claim 10, wherein said cell is an electrochemical cell.

12. The cell of claim 9, further comprising a photo-sensitizer in said water and an electromagnetic radiation source operatively arrange to expose said water with said photo-sensitizer to electromagnetic radiation, said photo-sensitizer providing an electrical potential between said amorphous cobalt tungstate and said water.

13. The cell of claim 12, wherein said photo-sensitizer is a ruthenium-tris(2,2'-bipyridyl) compound.

14. The cell of claim 13, wherein said ruthenium-tris(2,2'-bipyridyl) compound is ruthenium-tris(2,2'-bipyridyl) chloride.

* * * * *